United States Patent [19]

Pitsch et al.

[11] Patent Number: 4,677,484

[45] Date of Patent: Jun. 30, 1987

[54] STABILIZING ARRANGEMENT FOR ON-SCREEN DISPLAY

[75] Inventors: Robert A. Pitsch, Lawrence Township, Marion County; Billy W. Beyers, Jr., Greenfield, both of Ind.; Larry G. Moore, Phoenix, Ariz.; Juri Tults, Indianapolis, Ind.

[73] Assignee: RCA Corporation, Princeton, N.J.

[21] Appl. No.: 732,873

[22] Filed: May 10, 1985

[51] Int. Cl.[4] .......................... H04N 5/04; H04N 5/00
[52] U.S. Cl. ................................. 358/155; 358/158; 358/192.1
[58] Field of Search ............... 358/120, 148, 150, 153, 358/155, 158, 192.1; 331/20

[56] References Cited

U.S. PATENT DOCUMENTS

| | | | |
|---|---|---|---|
| 3,483,322 | 12/1969 | Graf | 358/155 |
| 3,553,365 | 1/1971 | Jauernik | 358/155 |
| 3,573,359 | 4/1971 | Guisinger | 178/6.6 |
| 3,609,220 | 6/1977 | Poel | 358/158 |
| 3,688,037 | 8/1972 | Ipri | 358/158 |
| 3,843,936 | 10/1974 | Kauderer | 331/20 |
| 4,001,715 | 1/1977 | Fukaya | 331/20 |
| 4,025,952 | 5/1977 | Eckenbrecht | 358/148 |
| 4,028,729 | 6/1977 | Browder | 358/148 |
| 4,096,528 | 6/1978 | Tüma et al. | 358/148 |
| 4,122,488 | 10/1978 | Mikado | 358/19 |
| 4,245,251 | 1/1981 | Steckler et al. | 358/155 |
| 4,250,525 | 2/1981 | Steckler et al. | 358/148 |
| 4,251,833 | 2/1981 | Fernsler et al. | 358/148 |
| 4,357,632 | 11/1982 | French | 358/193.1 |
| 4,387,407 | 6/1983 | Wine | 358/342 |
| 4,390,902 | 6/1983 | Chin et al. | 358/192.1 |
| 4,496,978 | 1/1985 | Sakamoto et al. | 358/155 |
| 4,524,387 | 6/1985 | Tamer | 358/150 |
| 4,536,797 | 8/1985 | Maturo et al. | 358/192.1 |

Primary Examiner—James J. Groody
Assistant Examiner—Michael D. Parker
Attorney, Agent, or Firm—P. J. Rasmussen; P. M. Emanuel; R. G. Coalter

[57] ABSTRACT

A television receiver includes apparatus for stabilizing an on-screen character display by which the deflection signal source is controlled for operating in a free-running mode, substantially unaffected by signal variations on the sync input line, rather than in a synchronized mode when sync is unreliable or otherwise undesirable. As another feature, the deflection signal source is caused to operate at substantially the same frequency in either mode.

7 Claims, 3 Drawing Figures

STABILIZING ARRANGEMENT FOR ON-SCREEN DISPLAY

BACKGROUND OF THE INVENTION

The present invention relates to the field of on-screen displays (OSD), particularly such as are employed to display information on a television (TV) picture screen.

In a TV receiver, it may be desirable to display directly on the picture screen information such as, for example, the selected channel number, a functional status message, a list of available programming options, or the time of day. Appropriate OSD signals corresponding to the information to be displayed may be generated by character or pattern generating OSD circuitry and applied to the luma/chroma processing portion of the TV receiver for display in the usual manner, possibly along with a picture produced in response to a received television signal.

Typically, the OSD signals are generated in synchronized relationship with timing pulses derived from the horizontal and vertical deflection signals, so as to locate the OSD in the desired portion of the picture screen. When a television signal is being received, such as off the air or from a tape or cable system, the horizontal and vertical deflection signals are synchronized with sync pulses derived from the received television signal by a sync separator. When the received television signal is present and sufficiently strong, the characters and symbols in the OSD will recur substantially in the same position on the picture screen from field to field and vertical character edges will not appear broken.

It may also be desirable to provide an OSD during certain times when no suitable television signal is being received by the TV receiver. This may be understood by considering that modern TV receivers may provide a number of viewer selectable options and features. Questions and prompting statements on the picture screen provide a convenient way of presenting the choices available and responding to selections made by a user. For example, a TV receiver may be arranged to cooperate with a number of accessory instruments, such as an antenna, a video cassette recorder (VCR), a cable distribution system, a computer and external loudspeakers. When the TV receiver is placed in a particular selection mode, an OSD may be used to present the choices for interconnecting various instruments in desired combinations. In another mode, the OSD may be used to request that a desired channel number be entered. The OSD may also provide a helpful explanation in ambiguous situations. For example, a TV receiver may be arranged to blank the picture screen when the receiver is tuned to a channel that is not providing a suitable television signal. The blank screen may be puzzling to a viewer unless, for example, the channel number and possibly an explanatory message are displayed by an OSD. Under the above and other similar conditions, either no suitable television signal is being received by the receiver or it is desirable that the display be independent of received signals.

However, at times when no suitable television signal is being received, there will be no proper separated sync signal available from the sync separator. Rather, the sync separator output will then provide a noisy signal. The deflection circuits in a typical TV receiver include an oscillator arrangement designed to be free-running in the absence of sync signals, usually at a slightly lower repetition rate than that produced when a proper sync signal is produced by the sync separator. The actual rate will be randomly affected by the noisy signal from the sync separator. Under such unsteady scanning conditions, the position of OSD characters and symbols will be likely to vary from one scanning line to another and from one scanning field to another, so that "jagged" edges and vertical "bounce" will be produced. This tends to reduce legibility and generally results in a displeasing and undesirable on-screen display.

It is possible to solve this problem by incorporating a substitute sync signal generator in the receiver to provide substitute sync signals to the deflection circuits when no suitable external signal is being received. However, this can considerably increase the cost of a receiver, particularly so, because the substitute sync signal generator tends to be rather complex in order to provide sync signals having the required stability.

SUMMARY OF THE INVENTION

In accordance with an aspect of the invention, a television receiver includes apparatus for stabilizing an on-screen display (OSD) synchronized with deflection signals provided by a deflection signal source. The deflection signal source has a sync input terminal coupled to a source of a sync signal, and a control input terminal for causing the deflection signal source to operate in one of a first operating mode in which the deflection signal source operates in synchronism with a sync signal applied to the sync input terminal and a second operating mode in which the deflection signal source is enabled for operating free-running and substantially unaffected by signal variations at the sync input terminal. A control arrangement is coupled to the control input for selecting one of the first and second operating modes.

In accordance with another aspect of the invention, the apparatus includes a frequency control arrangement for causing the frequency of the deflection signals to be substantially the same in the first and second operating modes.

BRIEF DESCRIPTION OF THE DRAWINGS

A preferred embodiment of the invention will be described with reference to the accompanying drawing consisting of FIGS. 1, 2 and 3.

DESCRIPTION OF THE INVENTION

Figure 1:
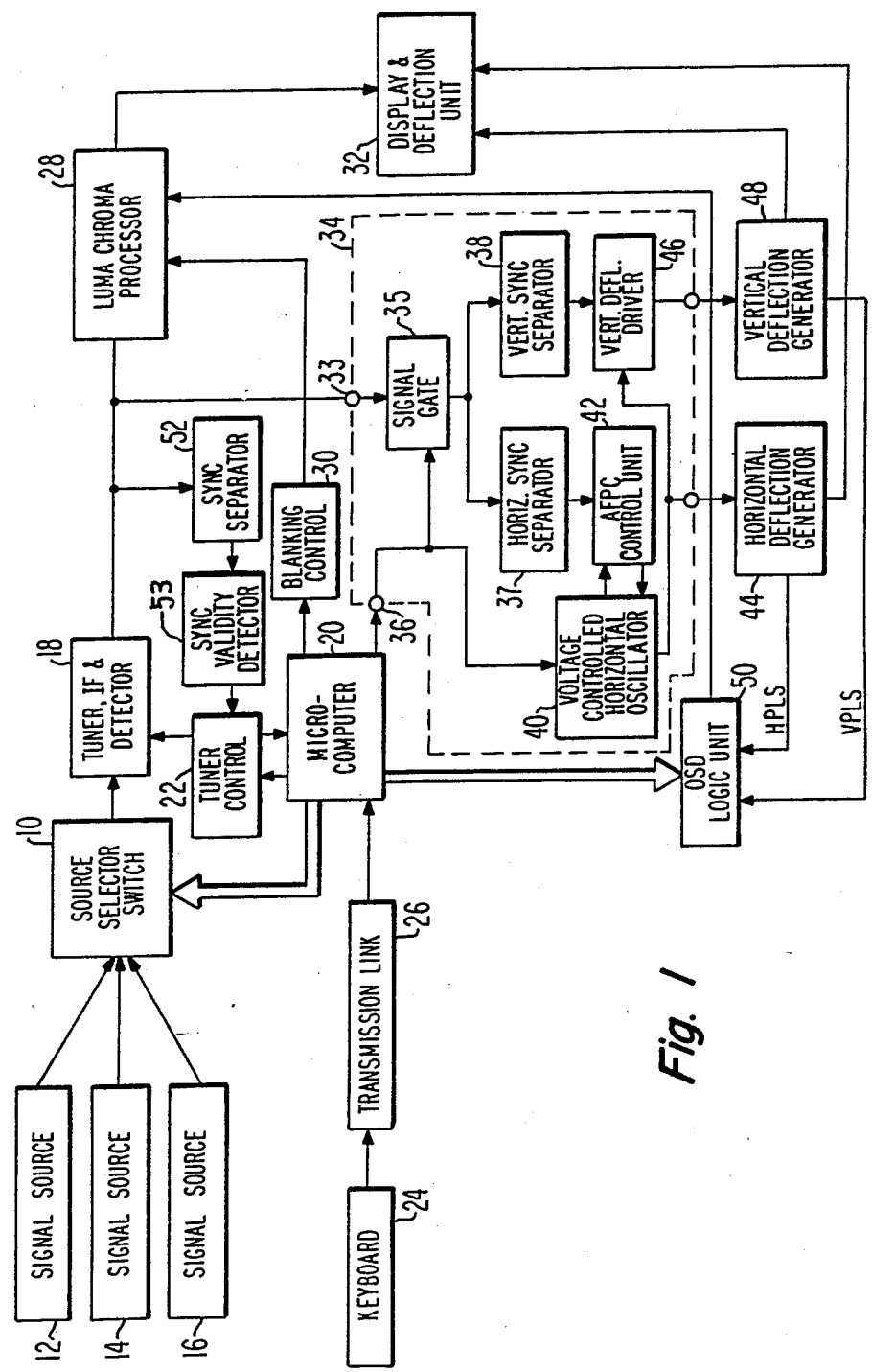
FIG. 1 shows in block diagram form a TV receiver including an arrangement for stabilizing an OSD constructed in accordance with the principles of the invention. Multiple logic lines are indicated by a wide line with a broad arrowhead.

In the television receiver shown in FIG. 1, a selector switch 10 selects a signal source from a number of sources illustratively shown as signal sources 12, 14, and 16. Typically, these may include any of a VCR, an antenna, a distribution cable, and a computer RF modulator. The selected signal is processed in the usual manner by tuner, intermediate frequency (IF) and detector stages shown as block 18. The channel selection tuner is controlled by a micro-computer 20 by way of a tuner control unit 22. An example of tuner control by microcomputer is disclosed in "RCA Color Television Basic Service Data CTC 131, File 1984, Second Edition,"

with Supplements S1, S2 and Addendum 1, published by RCA Corporation Consumer Electronics, Technical Publications, P.O. Box 1976, Indianapolis, IN 46206. See particularly Supplement S2, FIG. 26, Microcomputers U1 and U3. Micro-computer 20 is responsive to user entries made on a keyboard 24 of a handheld remote control transmitter unit. Remote control signals are coupled to micro-computer 20 by a transmission link 26. Typically, transmission link 26 may be an infra-red signal link or an ultra-sonic signal link.

The detected composite video signal produced by block 18 is processed by a luma/chroma processor 28 which also receives a blanking information signal from a blanking control unit 30, which is controlled by micro-computer 20. Luma/chroma processor 28 provides the usual three color signals to a display and deflection unit 32, which is typically a cathode-ray tube kinescope with associated deflection coils. The composite video signal from the detector in block 18 is coupled to an input terminal 33 of a deflection signal source 34. The composite video signal at terminal 33 is selectively coupled by way of a signal gate 35 to a horizontal (line) sync separator 37 and a vertical (frame) sync separator 38. Micro-computer 20 is coupled to signal gate 35 by way of a control input terminal 36. For the present portion of the description, signal gate 35 is considered to be transmissive, i.e. the composite video signal is coupled to sync separators 37 and 38. Horizontal sync separator 37 and vertical sync separator 38 typically utilize a signal differentiating network and a signal integrating network, respectively, to provide respective horizontal and vertical sync signals.

The horizontal sync signal is applied to a horizontal oscillator arrangement comprising a voltage controlled horizontal oscillator 40 and an automatic frequency and phase control (AFPC) unit 42. The frequency and phase of horizontal oscillator 40 are controlled in accordance with the horizontal sync signal by AFPC unit 42. The output signal of oscillator 40 drives a horizontal deflection generator 44 which supplies a horizontal deflection signal to display and deflection unit 32.

A vertical drive signal is provided by a vertical deflection driver 46, which comprises a count-down circuit which is supplied from horizontal oscillator 40 and which is synchronized with the vertical sync signal provided by vertical sync separator 38 to provide a vertical drive signal. The vertical drive signal drives a vertical deflection generator 48 which supplies a vertical deflection signal to display and deflection unit 32.

On-screen display (OSD) character and symbol signal generation is provided by an OSD logic unit 50 in accordance with control signals from micro-computer 20 and with horizontal pulses (HPLS) and vertical pulses (VPLS) for timing provided by horizontal deflection generator 44 and vertical deflection generator 48, respectively. OSD logic unit 50 provides luma/chroma processor 28 with an OSD signal which is synchronized with the deflection signals provided by deflection generators 44 and 48. It is noted that the synchronism between the OSD signal and the deflection signals does not depend on the horizontal and vertical sync signals supplied by sync separators 37 and 38 being present and is maintained even in the absence of such sync signals when oscillator 40 is free-running, because sync is provided to OSD logic unit 50 from deflection generators 44 and 48. OSD characters therefore maintain their relative positions on the picture screen whether sync signals are present or absent. As previously explained, however, the output signals of the horizontal and vertical sync separators become noisy signals containing random noise pulses in place of valid sync pulses in the absence of a suitable sync signal being received, so that, without the present invention, the OSD tends to present an undesirable jagged, bouncy appearance under such conditions.

In the described embodiment in accordance with the present invention, a sync separator 52 derives a composite sync signal from the composite video signal. The composite sync signal is examined by a sync validity detector 53 associated with tuner control unit 22 to determine whether a suitable sync signal is being received. A sync validity detector is known, for example, from col. 4, lines 48–58 of U.S. Pat. No. 4,357,632 issued to Michael P. French on Nov. 2, 1982, the relevant subject matter of which patent is herein incorporated by reference. The signal indicating the validity of the sync signal is coupled to micro-computer 20. When it is determined that no suitable sync signal is being received, indicated by a predetermined logic level being produced by the sync validity detector, micro-computer 20 causes signal gate 35 to be switched to a non-transmissive condition, thus cutting off the input signal to horizontal sync separator 37 and vertical sync separator 38. Instead of providing a noisy output signal under unsuitable received signal conditions, sync separators 37 and 38 provide no signal, thus causing the horizontal oscillator to free-run at its natural, relatively constant frequency. Consequently, both the horizontal and vertical deflection generators will provide free-running deflection signals to display and deflection unit 32. A previously mentioned, synchronism between the OSD signal and the deflection signals does not depend on the presence of sync signals, so that the position of the OSD characters being displayed remains stationary on the picture screen even under the condition described where signal gate 34 is non-transmissive. Moreover, the jagged and bouncy appearance of OSD characters under unsuitable signal conditions is substantially eliminated, since no randomly occurring pulses can reach horizontal oscillator 40. It is noted that sync separator 52 operates independently of horizontal sync separator 37 and vertical sync separator 38 and therefore remains unaffected when their input signal is interrupted by signal gate 34 under unsuitable received signal conditions.

Besides the condition of unsuitable sync, there are other circumstances in which it may be desirable for micro-computer 20 to cause the horizontal oscillator to free-run. For example, modern TV receivers may provide for a skip list of channels to be programmed into a memory. A user can enter undesired channel numbers into the skip memory. When a scan mode of tuning is selected, the tuning process will only stop at channels not programmed to be skipped. Such a system is disclosed in the aforementioned Supplement S2 of the RCA Color Television Service Data. It is possible to arrange for automatic skip memory programming so that only satisfactorily received channels are programmed not to be skipped. To do this, micro-computer 20 causes the tuning to advance sequentially through the channel numbers and stores those channel numbers for which sync validity detector indicates no suitable sync present. This programming process may typically take a minute or so for completion. During this time, the screen is preferably blanked, since channels are tuned in rapid succession, each for only a brief moment. It is useful, however, to display the channel numbers so that the user can monitor what is happening. Under such conditions of rapid scan tuning, including unoccupied channels, sync cannot be relied on, and consequently, micro-computer 20 is programmed to cause horizontal oscillator 40 to free-run during automatic programming, by causing signal gate 35 to be non-transmissive. A stable channel number display is thereby obtained.

Similarly, when an automatic "channel step" tuning mode is selected for sequential tuning at a typical rate of about 10 channels per second, sync cannot be relied on, and micro-computer 20 is therefore programmed to cause horizontal oscillator 40 to free-run during automatic channel step tuning.

The tuning process may also take an appreciable time for tuning from a presently tuned channel to another selected channel. For example, micro-computer 20 may typically require 200 milliseconds to retune to another channel, and in the case where a complicated tuning algorithm is required, as may be the case for cable channels, one second may be typically required. During this interval, it is desirable for the channel number display to be stable, even though a suitable sync signal may not be received. Accordingly, micro-computer 20 is programmed to cause horizontal oscillator 40 to free-run until the tuning process has been completed and a satisfactory sync signal is being received.

Furthermore, when other messages are to be displayed on a blanked screen, such as the time of day, a listing of available RF source choices, or prompting statements, the display is preferably made independent of whether or not a signal is being received, by causing the horizontal oscillator to free-run.

As has been mentioned, the free-running repetition rate is typically somewhat lower than the standard synchronized rate. This causes the free-running display to be somewhat larger than in the synchronized condition. In certain cases, such as when overscanning with loss of picture edges might result, it may be desirable to reduce this difference in size. To this end, in the FIG. 1 embodiment, micro-computer 20 also causes the free-running rate of voltage-controlled horizontal oscillator 40 to be increased substantially to the standard synchronized rate at the same time micro-computer 20 causes signal gate 35 to be in its non-transmissive condition. In the embodiment shown, the same signal is used for both purposes. The OSD size is thereby maintained substantially unchanged between the synchronized and free-running modes of operation.

Figure 2:
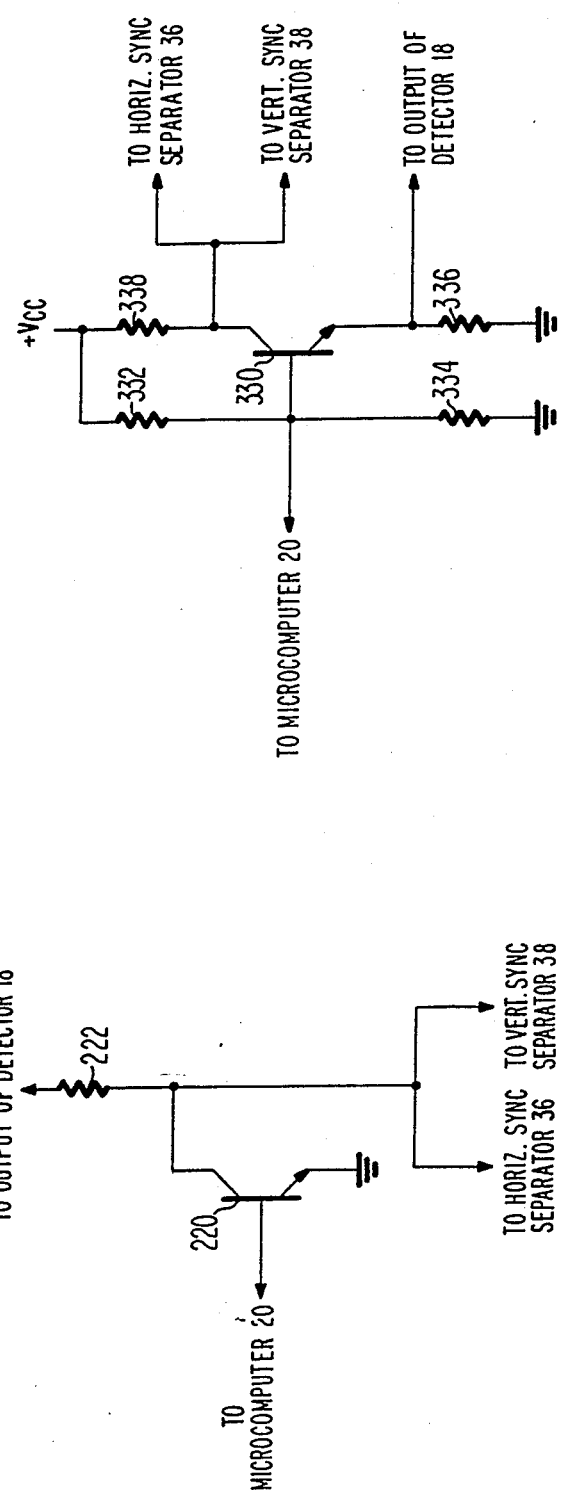

In the signal gate of FIG. 2, corresponding to signal gate 35 in FIG. 1, a transistor 220 is maintained in a substantially non-conductive state by micro-computer 20 so long as the composite video signal is to be allowed to reach sync separators 37 and 38, i.e. the signal gate is transmissive. A series resistor 222 is sufficiently low-valued for any loading by sync separators 37 and 38 to be negligible. When the signal gate is to be switched to a non-transmissive condition, micro-computer 20 applies a forward bias to the base of transistor 220 which thereby forms a relatively highly conductive shunt in a voltage divider configuration with resistor 222, thus substantially preventing the composite video signal from reaching sync separators 36 and 38.

Figure 3:
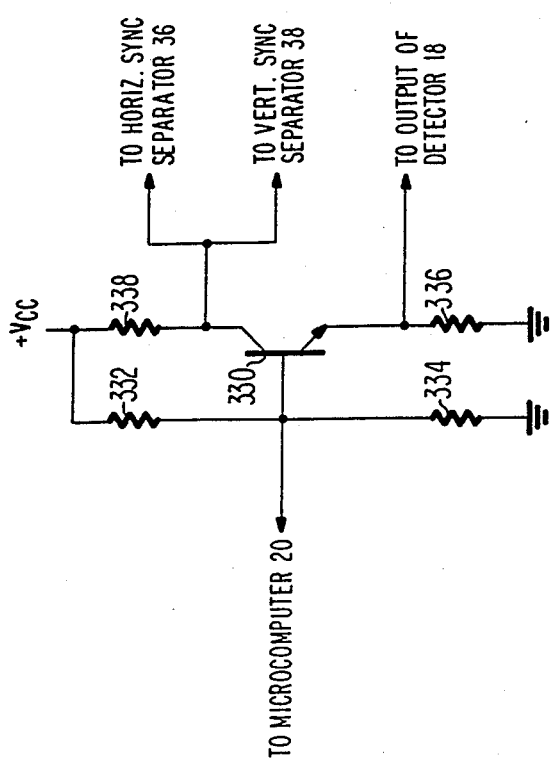
FIG. 2 and FIG. 3 show schematic diagrams for respective embodiments of a signal gate shown in FIG. 1 in block form.

An alternative signal gate is shown in FIG. 3. When the signal gate is to be transmissive, micro-computer 20 allows the base potential of a transistor 330 to be determined by a voltage divider comprising resistors 332 and 334, which causes transistor 330 to be biased for conduction. The composite video signal is applied to the emitter resistor 336 and the output signals to sync separator 37 and 38 are provided at collector load resistor 338. When the gate is to be switched to a non-transmissive condition, micro-computer 20 clamps the base potential close to ground, thus cutting off transistor 330, thereby preventing the composite video signal from reaching sync separators 37 and 38.

The implementation of the invention in accordance with FIGS. 1-3 is illustrative. Various modifications will suggest themselves to one skilled in the art and such modifications are contemplated to be within the scope of the present invention defined by the following claims. For example, while micro-computer 20 has been described as causing transmission gate 35 to become non-transmissive so as to inhibit sync signals from reaching the sync separators when no suitable sync is being received and under various other conditions, clearly micro-computer 20 may also be arranged to inhibit sync in other circumstances where this may be desirable. Sync may be inhibited, for example, after a brief interval of displaying a marginally weak or noisy channel signal, with an explanatory OSD statement. The countdown arrangement described may also be replaced by a vertical deflection circuit comprising a transistor or SCR deflection sweep oscillator without departing from the scope of the invention.

What is claimed is:

1. In a television receiver, including signal processing and display means, a source of a synchronizing (sync) signal, and a source of an on-screen display (OSD) signal coupled to said signal processing and display means, OSD display stabilizing apparatus comprising:

deflection signal source means for providing horizontal and vertical rate deflection signals, said deflection signal source means having a sync input terminal coupled to said source of a sync signal, having a deflection signal output coupled to each of said source of an OSD signal and said signal processing and display means, and having a control input terminal for causing a horizontal oscillator means in said deflection signal source means to operate in one of a first operating mode wherein said horizontal oscillator means operates in synchronism with a sync signal applied to said sync input terminal and a second operating mode wherein said horizontal oscillator means is enabled for operating in a free-running mode without synchronization by any source and is substantially unaffected by signal variations at said sync input terminal continuously during a time period at least as long as one period of said vertical rate deflection signal;
   control means coupled to said control input terminal for selecting one of said first and second operating modes.

2. The apparatus recited in claim 1, further including:
   user input means; and
   sync validity detecting means coupled to said signal processing and display means for providing a sync detector output signal indicative of the presence of a received sync signal having predetermined validity characteristics, and, wherein
   said control means is responsive to at least said sync detector output signal for selecting said one of said first and second operating modes.

3. The apparatus recited in claim 2 wherein said control means is further responsive to the entry of mode selection data on said user input means for selecting one of said first and second operating modes.

4. The apparatus recited in claim 2 wherein:
said deflection signal source means includes controllable oscillator means; and
gate means coupled between said source of said sync signal and said horizontal oscillator means and being responsive to said control means for selectively coupling said sync signal and a signal devoid of synchronizing information to said horizontal oscillator means in said first and second operating modes, respectively.

5. The apparatus recited in claim 4 wherein:
said deflection signal source means comprises means for providing horizontal and vertical deflection signals.

6. In a television receiver, including user input means, signal processing and display means, a source of a synchronizing (sync) signal, deflection signal source means for providing horizontal and vertical rate deflection signals, said deflection source means having a sync input terminal and exhibiting a synchronized mode of operation when a sync signal is present at said sync input terminal and a free-running mode of operation when no sync signal is present at said sync input terminal, and a source of an on-screen display (OSD) signal coupled to said signal processing and display means, display stabilizing apparatus comprising:
selectively operable switch means for coupling said sync input to one of said source of a sync signal and a point of reference potential substantially free of any sync signal, control means coupled to said source of a sync signal and being responsive to at least one of predetermined data entry on said user input means and said source of a sync signal providing a sync signal not conforming to predetermined characteristics for causing said switch means to couple said sync input to said point of reference potential continuously during a time period at least as long as one period of said vertical rate deflection signal, such that said deflection signal source means is in said free-running mode of operation.

7. In a television receiver, including signal processing and display means, a source of a synchronizing (sync) signal, and a source of an on-screen display (OSD) signal coupled to said signal processing and display means, OSD displaying stabilizing apparatus comprising:
deflection signal source means for providing horizontal and vertical rate deflection signals, said deflection signal source means having a sync input terminal coupled to said source of a sync signal, having a deflection signal output coupled to each of said source of an OSD signal and said signal processing and display means, and having a control input terminal for causing said deflection signal source means to operate in one of a first operating mode wherein said deflection signal source means operates in synchronism with a sync signal applied to said sync input terminal and a second operating mode wherein said deflection source means is enabled for operating free-running and substantially unaffected by signal variations at said sync input terminal continuously during a time period at least as long as one period of said vertical rate deflection signal;
control means coupled to said control input terminal for selecting one of said first and second operating modes, and wherein
said deflection signal source means includes a frequence controllable oscillator means providing an output signal having a frequency which tends to differ in said first and second operating modes; and
circuit means for coupling said control means to a frequency control input of said controllable oscillator means for causing said output signal frequency to be substantially the same in said first and second operating modes.

* * * * *